United States Patent
Lin et al.

(10) Patent No.: US 10,820,286 B2
(45) Date of Patent: *Oct. 27, 2020

(54) NARROWBAND LTE CELL SEARCH

(71) Applicant: Telefonaktiebolaget LM Ericsson (publ), Stockholm (SE)

(72) Inventors: Xingqin Lin, Santa Clara, CA (US); Ansuman Adhikary, Santa Clara, CA (US); Niklas Johansson, Uppsala (SE); Yi-Pin Eric Wang, Fremont, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/242,782

(22) Filed: Jan. 8, 2019

(65) Prior Publication Data

US 2019/0150109 A1  May 16, 2019

Related U.S. Application Data

(63) Continuation of application No. 15/218,706, filed on Jul. 25, 2016, now Pat. No. 10,206,189.

(Continued)

(51) Int. Cl.
 *H04W 56/00* (2009.01)
 *H04J 11/00* (2006.01)
 (Continued)

(52) U.S. Cl.
 CPC ....... *H04W 56/001* (2013.01); *H04J 11/0069* (2013.01); *H04L 5/001* (2013.01);
 (Continued)

(58) Field of Classification Search
 None
 See application file for complete search history.

(56) References Cited

U.S. PATENT DOCUMENTS

| 10,206,189 B2* | 2/2019 | Lin ................... H04L 5/001 |
| 2012/0021753 A1 | 1/2012 | Damnjanovic et al. |

(Continued)

FOREIGN PATENT DOCUMENTS

| CN | 101689933 A | 3/2010 |
| CN | 101719890 A | 6/2010 |
| WO | 2015080646 A1 | 6/2015 |

OTHER PUBLICATIONS

Author Unkown, "LTE-Lite for Cellular IOT," Narrowband LTE, May 27, 2014, Ericsson AB, 36 pages.

(Continued)

*Primary Examiner* — Mohammad S Adhami
(74) *Attorney, Agent, or Firm* — Withrow & Terranova, PLLC (57) ABSTRACT

Systems and methods relating to a narrowband Primary Synchronization Signal (NB-PSS) and a narrowband Secondary Synchronization Signal (NB-SSS) are disclosed. In some embodiments, a base station in a wireless network comprises a processor and storage that stores instructions executable by the processor whereby the base station is operable to transmit a NB-PSS and a NB-SSS in a narrowband portion of a downlink system bandwidth. The NB-PSS and the NB-SSS are transmitted such that more than two occurrences of the NB-PSS and more than two occurrences of the NB-SSS are transmitted over a defined time interval, each occurrence of the NB-PSS is transmitted over multiple contiguous Orthogonal Frequency Division Multiplexing (OFDM) symbols and each occurrence of the NB-SSS is transmitted over multiple contiguous OFDM symbols, and each occurrence of the NB-SSS provides an indication of a location of the occurrence of the NB-SSS within the defined time interval.

28 Claims, 7 Drawing Sheets

Related U.S. Application Data (60) Provisional application No. 62/197,364, filed on Jul. 27, 2015.

(51) Int. Cl.
*H04L 5/00* (2006.01)
*H04W 4/70* (2018.01)
*H04W 48/12* (2009.01)
*H04W 88/08* (2009.01)

(52) U.S. Cl.
CPC ............ *H04W 4/70* (2018.02); *H04W 48/12* (2013.01); *H04W 56/0015* (2013.01); *H04W 88/08* (2013.01)

(56) References Cited

U.S. PATENT DOCUMENTS

| | | |
|---|---|---|
| 2012/0046056 A1 | 2/2012 | Luo et al. |
| 2014/0335853 A1 | 11/2014 | Sartori et al. |
| 2015/0049741 A1 | 2/2015 | Chen et al. |
| 2016/0073366 A1* | 3/2016 | Ng ............... H04W 56/001 370/329 |
| 2016/0227502 A1* | 8/2016 | Vos ............... H04W 56/0015 |
| 2016/0234763 A1 | 8/2016 | Um et al. |
| 2016/0262123 A1 | 9/2016 | Abedini et al. |
| 2016/0308637 A1 | 10/2016 | Frenne et al. |
| 2017/0012753 A1 | 1/2017 | Kim et al. |
| 2017/0034798 A1 | 2/2017 | Lin et al. |
| 2017/0078998 A1 | 3/2017 | Li |
| 2017/0195102 A1 | 7/2017 | Xiong et al. |
| 2018/0184390 A1* | 6/2018 | Wu ............... H04W 4/70 |

OTHER PUBLICATIONS

Author Unknown, "Technical Specification Group GSM/EDGE Radio Access Network; Cellular System Support for Ultra Low Complexity and Low Throughput Internet of Things; (Release 13)," Technical Report 45.820, Version 1.4.0, 3GPP Organizational Partners, Jul. 2015, 361 pages.

Author Unknown, "Technical Specification Group GSM/EDGE Radio Access Network; Cellular system support for ultra-low complexity and low throughput Internet of Things (CIoT) (Release 13),"Technical Report 45.820, Version 13.1.0, 3GPP Organizational Partners, Nov. 2015, 495 pages.

Author Unknown, "Technical Specification Group Radio Access Network; Evolved Universal Terrestrial Radio Access (E-UTRA); Physical channels and modulation (Release 12)," Technical Specification 36.211, Version 12.6.0, 3GPP Organizational Partners, Jun. 2015, 136 pages.

Ericsson LM et al., "R1-154659: Narrowband LTE—Concept Description," 3rd Generation Partnership Project (3GPP), TSG RAN WG1 Meeting #82, Aug. 24-28, 2015, 9 pages, Beijing, China.

Vodafone Group PLC., "GP-140421: New Study Item on Cellular System Support for Ultra Low Complexity and Low Throughput Internet of Things," 3rd Generation Partnership Project (3GPP), TSG-GERAN Meeting #62, May 26-30, 2014, 6 pages, Valencia, Spain.

Non-Final Office Action for U.S. Appl. No. 15/218,706, dated Nov. 9, 2017, 14 pages.

Final Office Action for U.S. Appl. No. 15/218,706, dated May 15, 2018, 14 pages.

Notice of Allowance and Examiner-Initiated Interview Summary for U.S. Appl. No. 15/218,706 , dated Sep. 21, 2018, 11 pages.

International Search Report and Written Opinion for International Patent Application No. PCT/IB2016/054453, dated Oct. 19, 2016, 16 pages.

Advisory Action, Examiner-Initiated Interview Summary, and AFCP 2.0 Decision for U.S. Appl. No. 15/218,706, dated Jul. 30, 2018, 7 pages.

Search Report for Chinese Patent Application No. 201680056295.1, dated Mar. 15, 2020, 2 pages.

First Office Action for Chinese Patent Application No. 201680056295.1, dated Mar. 20, 2020, 17 pages.

Author Unknown, "Technical Specification Group GSM/EDGE Radio Access Network; Cellular System Support for Ultra Low Complexity and Low Throughput Internet of Things; (Release 13)," Technical Report 45.820, Version 1.3.1, 3GPP Organizational Partners, Jun. 2015, 271 pages.

Examination Report for Indian Patent Application No. 201817002423, dated May 26, 2020, 5 pages.

* cited by examiner

NARROWBAND LTE CELL SEARCH

RELATED APPLICATIONS

This application is a continuation of patent application Ser. No. 15/218,706, filed Jul. 25, 2016, now U.S. Pat. No. 10,206,189, which claims the benefit of provisional patent application Ser. No. 62/197,364, filed Jul. 27, 2015, the disclosures of which are hereby incorporated herein by reference in their entireties.

TECHNICAL FIELD

The present disclosure relates to cell search in a wireless network.

BACKGROUND

Cellular communication systems are currently being developed and improved for Machine Type Communication (MTC), communication characterized by lower demands on data rates than for example mobile broadband, but with higher requirements on, e.g., low-cost device design, better coverage, and ability to operate for years on batteries without charging or replacing the batteries. In the Third Generation Partnership Project (3GPP) Global System for Mobile Communication (GSM)/Enhanced Data Rates for GSM Evolution (EDGE) Radio Access Network (GERAN) specification group, cellular communication systems are being improved and developed in the feasibility study named VODAFONE Group Plc., "GP-140421: New Study Item on Cellular System Support for Ultra Low Complexity and Low Throughput Internet of Things," 3GPP TSG-GERAN Meeting #62, May 26-30, 2014. Both GSM evolution and new "clean slate" systems are being developed. These clean slate solutions are narrowband systems with a carrier bandwidth of 200 kilohertz (kHz) that target improved coverage compared to today's GSM systems, long battery life, and low complexity communication design. One intention with this solution is to deploy the narrowband carrier in spectrum that is currently used for GSM, by reducing the system bandwidth used by GSM and deploying Narrowband (NB) Machine-to-Machine (M2M) communication in the spectrum that becomes available. Another intention is to reuse existing GSM sites for the deployment of NB M2M. Narrowband Long Term Evolution (LTE) is one such solution that borrows most of the design principles from LTE and is currently being proposed as one of the competing proposals for this study. While NB LTE satisfies all the requirements put forward by MTC-type applications, it also features backward compatibility with the current LTE radio access technology, making it very attractive.

In cellular communication systems, devices use a cell search procedure, or synchronization procedure, to understand the cell(s) to which the devices are to connect. Essential functions of a cell search procedure are to detect a suitable cell to camp on and, for that cell, obtain the symbol and frame timing and synchronize to the carrier frequency. When synchronizing to the carrier frequency, the device needs to correct any erroneous frequency offsets that are present and perform symbol timing alignment with the frame structure from the base station. In addition, in the presence of multiple cells, the device also needs to distinguish the particular cell on the basis of a cell identity (ID). Thus, a typical cell search procedure consists of determining the timing alignment, correcting the frequency offset, and obtaining the correct cell ID.

Figure 1:
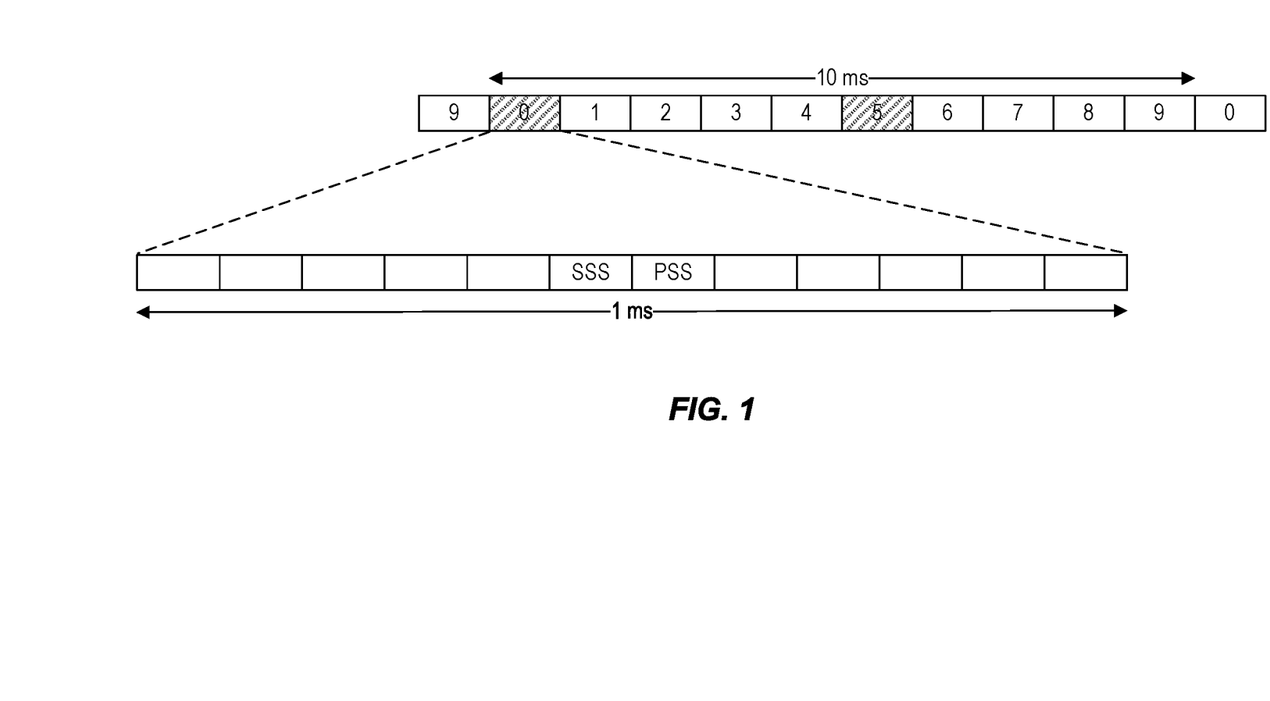
FIG. 1 illustrates the Primary Synchronization Signal (PSS) and Secondary Synchronization Signal (SSS) structure in Third Generation Partnership Project (3GPP) Long Term Evolution (LTE)

Cell search in LTE uses two special signals, namely, the Primary Synchronization Signal (PSS) and the Secondary Synchronization Signal (SSS). As illustrated in FIG. 1, the PSS and the SSS are in the seventh and sixth Orthogonal Frequency Division Multiplexing (OFDM) symbols of the first and sixth subframes (labeled as subframes 0 and 5) of every 10 millisecond (ms) frame. Note that this design is for Frequency Division Duplexing (FDD) systems only. In systems operating in Time Division Duplexing (TDD) mode, the PSS and the SSS are placed in a different position within the frame.

Five-hundred and four (504) unique cell identities are supported in LTE. Specifically, LTE supports 168 cell ID groups, where each cell ID group includes three cell IDs. In other words, the 504 unique cell IDs are divided into 168 cell ID groups, with three cell IDs within each cell ID group. As a result, three PSSs (i.e., three PSS sequences) are used to provide the cell ID within a cell ID group. The two PSSs within a frame are identical, implying that the PSS is repeated every 5 ms in LTE. This enables the user terminal (i.e., the User Equipment (UE)) to determine the 5 ms timing of the cell and also correct the frequency offset. The position of the PSS gives the location of the SSS, which occupies the previous OFDM symbol. The sequences used in the SSS are interleaved in a different manner in the two subframes within a frame to obtain the correct frame timing and determine the particular cell ID group from the 168 possible alternatives.

The three PSSs are length-63 Zadoff-Chu sequences extended with five zeros at the edges and mapped to the center 73 subcarriers. The DC subcarrier is not transmitted, therefore, only 62 elements of the Zadoff-Chu sequences are used. The SSS is composed of two length-31 m-sequences interleaved in a specific manner in the two subframes (swapped in the frequency domain) to determine the correct frame timing. Since 31 cyclic shifts of an m-sequence are possible and all of them are orthogonal to one another, the SSS for a cell ID group is composed of two specific cyclic shifts of the two m-sequences.

The PSS and the SSS used for the conventional cell search procedure in LTE span the center 72 subcarriers. However, in NB LTE and similar NB systems, the bandwidth is, e.g., 200 kHz, which is about 12 subcarriers at the conventional subcarrier spacing in LTE of 15 kHz. As such, there is a need for a PSS and SSS structure for cell search in NB LTE or similar in-band NB system.

SUMMARY

Systems and methods relating to a Narrowband Primary Synchronization Signal (NB-PSS) and a Narrowband Secondary Synchronization Signal (NB-SSS) are disclosed. In some embodiments, a base station in a wireless network comprises a processor and storage that stores instructions executable by the processor whereby the base station is operable to transmit a NB-PSS and a NB-SSS in a narrowband portion of a downlink system bandwidth. The NB-PSS and the NB-SSS are transmitted such that more than two occurrences of the NB-PSS and more than two occurrences of the NB-SSS are transmitted over a defined time interval, each occurrence of the NB-PSS is transmitted over multiple contiguous Orthogonal Frequency Division Multiplexing (OFDM) symbols and each occurrence of the NB-SSS is transmitted over multiple contiguous OFDM symbols, and each occurrence of the NB-SSS provides an indication of a location of the occurrence of the NB-SSS within the defined time interval. In some embodiments, the NB-PSS and the NB-SSS enable cell search for narrowband technologies such as, but not limited to, narrowband Long Term Evolution (LTE).

In some embodiments, the narrowband portion of the downlink system bandwidth consists of 12 OFDM subcarriers. In some other embodiments, the narrowband portion of the downlink system bandwidth has a bandwidth of 200 kilohertz (kHz). In some other embodiments, the narrowband portion of the downlink system bandwidth has a bandwidth of 180 kHz. In some embodiments, the downlink system bandwidth is greater than or equal to 1.4 megahertz (MHz).

In some embodiments, for each occurrence of the NB-SSS, a NB-SSS sequence for the occurrence is a function of the location of the occurrence of the NB-SSS within the defined time interval. Further, in some embodiments, the NB-SSS sequence is a combination of: (a) a base sequence that is a function of a cell identity (ID) group of a respective cell and (b) a scrambling code that is a function of a location within the defined time interval. Further, in some embodiments, the base sequence comprises a cyclic shift that removes a phantom cell effect. In some other embodiments, the base sequence comprises a cyclic shift that varies for a same cell ID across different cell ID groups.

In some embodiments, a NB-PSS sequence for the NB-PSS is a differentially encoded Zadoff-Chu sequence.

In some embodiments, the NB-PSS provides an indication of a cell ID within a cell ID group for a respective cell.

In some embodiments, the NB-SSS provides an indication of a cell ID group for a respective cell.

Embodiments of a method of operation of a base station in a wireless network are also disclosed. In some embodiments, the method of operation of the base station comprises transmitting a NB-PSS and a NB-SSS in a narrowband portion of a downlink system bandwidth. Transmitting the NB-PSS and the NB-SSS is such that more than two occurrences of the NB-PSS and more than two occurrences of the NB-SSS are transmitted over a defined time interval, each occurrence of the NB-PSS is transmitted over multiple contiguous OFDM symbols and each occurrence of the NB-SSS is transmitted over multiple contiguous OFDM symbols, and each occurrence of the NB-SSS provides an indication of a location of the occurrence of the NB-SSS within the defined time interval.

In some embodiments, the narrowband portion of the downlink system bandwidth consists of 12 OFDM subcarriers. In some other embodiments, the narrowband portion of the downlink system bandwidth has a bandwidth of 200 kHz. In some other embodiments, the narrowband portion of the downlink system bandwidth has a bandwidth of 180 kHz. In some embodiments, the downlink system bandwidth is greater than or equal to 1.4 MHz.

In some embodiments, for each occurrence of the NB-SSS, a NB-SSS sequence for the occurrence is a function of the location of the occurrence of the NB-SSS within defined time interval.

In some embodiments, a base station in a wireless network is provided, wherein the base station is adapted to transmit a NB-PSS and a NB-SSS in a narrowband portion of a downlink system bandwidth. The base station is adapted to transmit the NB-PSS and the NB-SSS such that more than two occurrences of the NB-PSS and more than two occurrences of the NB-SSS are transmitted over a defined time interval, each occurrence of the NB-PSS is transmitted over multiple contiguous OFDM symbols and each occurrence of the NB-SSS is transmitted over multiple contiguous OFDM symbols, and each occurrence of the NB-SSS provides an indication of a location of the occurrence of the NB-SSS within the defined time interval.

In some embodiments, a base station in a wireless network comprises a transmission module operable to transmit a NB-PSS and a NB-SSS in a narrowband portion of a downlink system bandwidth. The transmission module transmits the NB-PSS and the NB-SSS such that more than two occurrences of the NB-PSS and more than two occurrences of the NB-SSS are transmitted over a defined time interval, each occurrence of the NB-PSS is transmitted over multiple contiguous OFDM symbols and each occurrence of the NB-SSS is transmitted over multiple contiguous OFDM symbols, and each occurrence of the NB-SSS provides an indication of a location of the occurrence of the NB-SSS within the defined time interval.

Embodiments of a wireless device in a wireless network are also disclosed. In some embodiments, the wireless device comprises a processor and storage that stores instructions executable by the processor whereby the wireless device is operable to perform a cell detection procedure based on a NB-PSS and a NB-SSS received in a narrowband portion of a downlink system bandwidth. More than two occurrences of the NB-PSS and more than two occurrences of the NB-SSS are transmitted over a defined time interval. Further, each occurrence of the NB-PSS is transmitted over multiple contiguous OFDM symbols and each occurrence of the NB-SSS is transmitted over multiple contiguous OFDM symbols. Still further, each occurrence of the NB-SSS provides an indication of a location of the occurrence of the NB-SSS within the defined time interval.

In some embodiments, the narrowband portion of the downlink system bandwidth consists of 12 OFDM subcarriers. In some other embodiments, the narrowband portion of the downlink system bandwidth has a bandwidth of 200 kHz. In some other embodiments, the narrowband portion of the downlink system bandwidth has a bandwidth of 180 kHz. In some embodiments, the downlink system bandwidth is greater than or equal to 1.4 MHz.

In some embodiments, for each occurrence of the NB-SSS, a NB-SSS sequence for the occurrence is a function of the location of the occurrence of the NB-SSS within the defined time interval. Further, in some embodiments, the NB-SSS sequence is a combination of: (a) a base sequence that is a function of a cell ID group of a respective cell (14) and (b) a scrambling code that is a function of a location within the defined time interval. Further, in some embodiments, the base sequence comprises a cyclic shift that removes a phantom cell effect. In some other embodiments, the base sequence comprises a cyclic shift that varies for a same cell ID across different cell ID groups.

In some embodiments, a NB-PSS sequence for the NB-PSS is a differentially encoded Zadoff-Chu sequence.

In some embodiments, performing the cell detection procedure comprises detecting the NB-PSS and determining a cell ID within a cell ID group for a respective cell based on the detected NB-PSS.

In some embodiments, performing the cell detection procedure comprises detecting the NB-SSS and determining a cell ID group for a respective cell and a frame timing for the respective cell based on the detected NB-SSS.

Embodiments of a method of operation of a wireless device in a wireless network are also disclosed. In some embodiments, the method of operation of the wireless device comprises performing a cell detection procedure based on a NB-PSS and a NB-SSS received in a narrowband portion of a downlink system bandwidth. More than two occurrences of the NB-PSS and more than two occurrences of the NB-SSS are transmitted over a defined time interval. Further, each occurrence of the NB-PSS is transmitted over multiple contiguous OFDM symbols and each occurrence of the NB-SSS is transmitted over multiple contiguous OFDM symbols. Still further, each occurrence of the NB-SSS provides an indication of a location of the occurrence of the NB-SSS within the defined time interval.

In some embodiments, a wireless device in a wireless network is provided, wherein the wireless device is adapted to perform a cell detection procedure based on a NB-PSS and a NB-SSS received in a narrowband portion of a downlink system bandwidth. More than two occurrences of the NB-PSS and more than two occurrences of the NB-SSS are transmitted over a defined time interval. Further, each occurrence of the NB-PSS is transmitted over multiple contiguous OFDM symbols and each occurrence of the NB-SSS is transmitted over multiple contiguous OFDM symbols. Still further, each occurrence of the NB-SSS provides an indication of a location of the occurrence of the NB-SSS within the defined time interval.

In some embodiments, a wireless device in a wireless network comprises a cell detection module operable to perform a cell detection procedure based on a NB-PSS and a NB-SSS received in a narrowband portion of a downlink system bandwidth. More than two occurrences of the NB-PSS and more than two occurrences of the NB-SSS are transmitted over a defined time interval. Further, each occurrence of the NB-PSS is transmitted over multiple contiguous OFDM symbols and each occurrence of the NB-SSS is transmitted over multiple contiguous OFDM symbols. Still further, each occurrence of the NB-SSS provides an indication of a location of the occurrence of the NB-SSS within the defined time interval.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

With the new Machine Type Communication (MTC) systems and the MTC improvements of current systems, coverage is extended. This means that many devices will operate in bad or extended coverage with much lower received signal strength levels than before. Performing the procedures associated with cell search, in particular, to estimate the time offset, the frequency offset, and the cell identity (ID), becomes more difficult with weak signals. This necessitates the device to accumulate multiple frames, or multiple repetitions, of synchronization signals to gather enough energy over time to achieve good enough detection and estimation accuracy.

In Narrowband Long Term Evolution (NB LTE), the basic resource block contains 12 subcarriers. If the synchronization sequences (i.e., the Primary Synchronization Signal (PSS) and the Secondary Synchronization Signal (SSS)) in LTE are remapped in NB LTE, the PSS and SSS sequences would span multiple non-contiguous Orthogonal Frequency Division Multiplexing (OFDM) symbols. This may degrade cell search performance. Another problem in LTE design is the so called "phantom cell effect," which occurs due to the use of common SSS sequences for identifying two different cell ID groups. If the amount of resource used for cell synchronization signals in narrowband LTE is the same as that used for cell synchronization in LTE, a larger amount of accumulation would be required, which means extending the time required for synchronization and cell search. Thus, the device would be active for a longer period of time, which introduces a delay and reduces the battery life of the device.

A cell search design for NB LTE, which is a candidate proposal for supporting Ultra Low Complexity and Low Throughput Internet of Things (IoT), is proposed. Notably, as will be appreciated by one of ordinary skill in the art, while much of the discussion herein focuses on NB LTE, the cell search design described herein is equally applicable to similar NB technologies such as, e.g. NB Internet of Things. The design incorporates many of the features and design guidelines for cell search in current LTE systems and provides backward compatibility. Further, the "phantom cell effect" present in the current SSS design of LTE is removed by carefully choosing the SSS for NB LTE.

As in LTE, a PSS based on a differentially encoded Zadoff-Chu sequence is transmitted from the base station in each cell and is used by the device (also referred to herein as a terminal or User Equipment (UE)) to obtain both time offset estimation and frequency offset estimation. By using a differentially encoded sequence, the time offset estimation is robust to large frequency errors. Thus, good time offset estimation accuracy can be achieved, independent of frequency error. This also reduces the receiver complexity at the user terminal because LTE user terminals need to test for a number of frequency hypotheses in order to obtain satisfactory time estimation. When the time offset has been determined, the same PSS is reused for frequency offset estimation.

After the time and frequency offsets have been corrected, the SSS is used to obtain the ID of the cell as well as the frame timing, i.e., the location of the synchronization signals in the frame. The SSS is composed of two Zadoff-Chu sequences which are carefully chosen so that no two SSSs belonging to different cell IDs have a common sequence. In addition, these sequences are scrambled with different sequences to aid in the detection of frame timing.

The proposed solution enables cell search for a NB LTE based solution for MTC applications. The design incorporates the basic design principles of LTE cell search with suitable modifications to further optimize the design for MTC devices. The design allows backward compatibility with current LTE systems, making it suitable to be deployed both as a stand-alone solution as well as within the inner bands of LTE, offering growth and scalability not currently found in other narrowband solutions.

The design also allows the receiver at the user terminals to achieve synchronization with reduced complexity compared to LTE by making use of differential encoding. This plays a key role in removing the errors due to frequency offset, thus eliminating the need to search over a range of frequency hypotheses currently used in LTE cell search algorithms.

In addition, the proposed solution also provides an alternative SSS design that is robust to the "phantom cell effect" in LTE while providing support for the same number of cell IDs supported by LTE.

Figure 2:
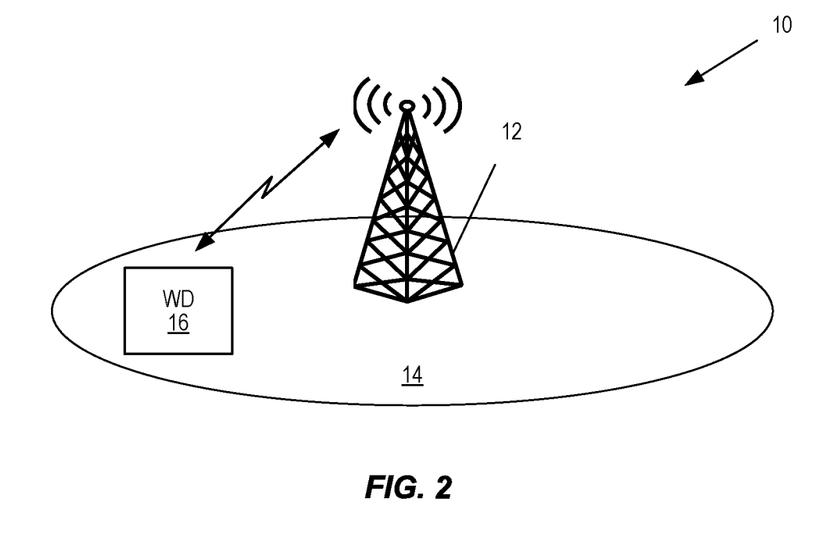
FIG. 2 illustrates one example of a wireless network in which embodiments of the present disclosure may be implemented.

FIG. 2 illustrates one example of a wireless network 10 in which embodiments of the present disclosure may be implemented. As illustrated, the wireless network 10 includes a base station 12 serving a cell 14. A wireless device 16 is provided wireless access to the wireless network 10 via the base station 12. In some embodiments, the wireless device 16 is a MTC device, and the base station 12 provides wireless access to the wireless device 16 using a NB technology (e.g., NB LTE) that is implemented within bandwidth of a wideband technology (LTE). The wireless device 16 may also be referred to herein as a UE, a user terminal, a terminal, or the like. Further, while the concepts are not limited thereto, the NB technology is, in many of the example embodiments described herein, NB LTE. However, the present disclosure is equally applicable to other in-band NB technologies such as, for example, NB IoT.

In order to maximize synergies with the LTE design, NB LTE relies on a time remapping of the LTE resources. However, a time domain remapping of the conventional LTE PSS and SSS would result in the synchronization sequences spread over multiple subframes. This may not be desirable because it may be preferred to use a contiguous sequence in the time domain to simplify receiver processing. Therefore, cell search in NB LTE follows the same principle as in LTE, but with suitable modifications in the design of the different sequences to improve the cell search capability.

As described herein, the base station 12 transmits a PSS and a SSS within a narrowband portion of a downlink system bandwidth. This PSS and SSS are sometimes referred to herein as a NB-PSS and a NB-SSS in order to clearly distinguish them from the conventional PSS and SSS used in LTE. The NB-PSS and the NB-SSS are each transmitted within the narrowband portion (e.g., 180 kilohertz (kHz) or 200 kHz portion) of the larger downlink system bandwidth (e.g., 1.4 megahertz (MHz) or greater). The NB-PSS is transmitted more than two times over a defined time interval (e.g., 60 milliseconds (ms)). Each occurrence of the NB-PSS within this defined time interval is referred to herein as an "occurrence of the NB-PSS" or "NB-PSS occurrence." For each occurrence of the NB-PSS, the NB-PSS, or more specifically the NB-PSS sequence, is transmitted over multiple contiguous OFDM symbols (e.g., multiple contiguous OFDM symbols within a single subframe). For example, if the narrowband portion of the downlink system bandwidth consists of 12 OFDM subcarriers and the NB-PSS sequence has a length of 71 symbols, then the NB-PSS is transmitted over six contiguous OFDM symbols. In some embodiments, the NB-PSS sequence is a differentially-encoded Zadoff-Chu sequence.

The NB-SSS is also transmitted more than two times over the defined time interval. Each occurrence of the NB-SSS within the defined time interval is referred to herein as an "occurrence of the NB-SSS" or "NB-SSS occurrence." For each occurrence of the NB-SSS, the NB-SSS, or more specifically the NB-SSS sequence, is transmitted over multiple contiguous OFDM symbols (e.g., multiple contiguous OFDM symbols within a single subframe). For example, if the narrowband portion of the downlink system bandwidth consists of 12 OFDM subcarriers and the NB-SSS sequence has a length of 71 symbols, then the NB-SSS is transmitted over six contiguous OFDM symbols. Further, for each occurrence of the NB-SSS within the defined time interval, the NB-SSS, or more specifically the NB-SSS sequence, indicates the location of the NB-SSS within the defined time interval. By indicating the location of the NB-SSS within the defined time interval, the NB-SSS indicates the frame timing of the respective cell.

Figure 3:
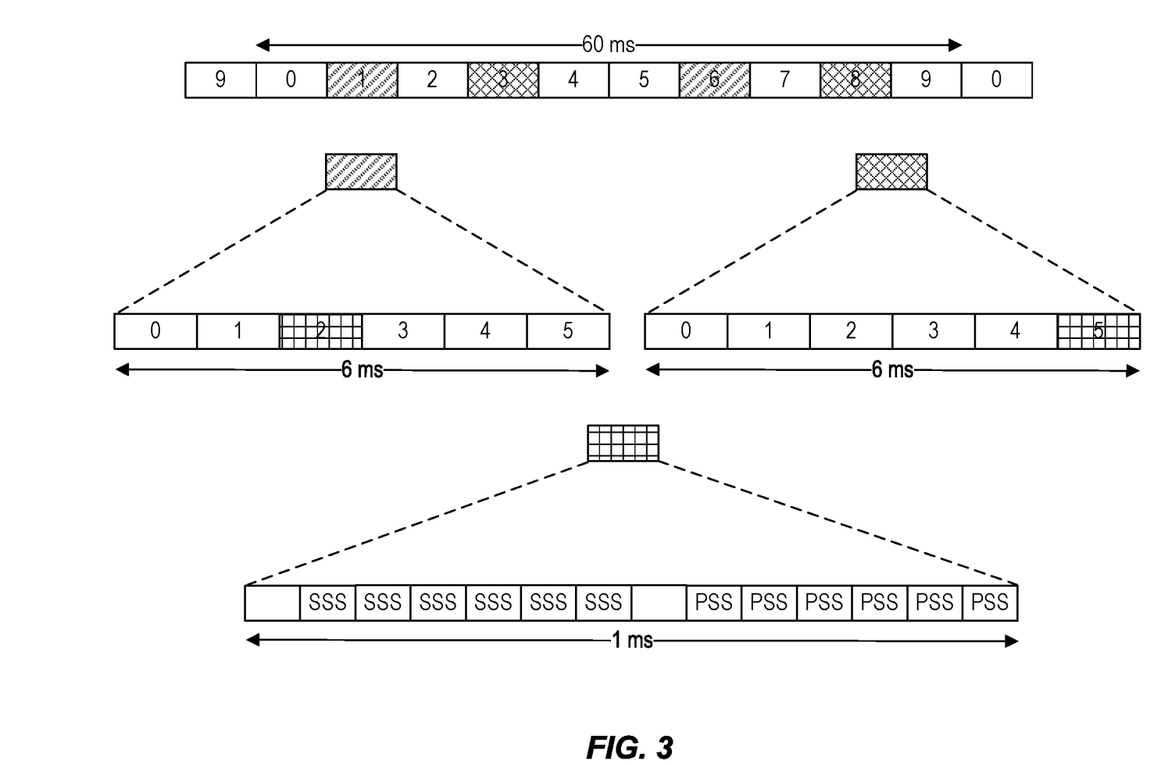
FIG. 3 illustrates one example structure of a Narrowband PSS (NB-PSS) and a Narrowband SSS (NB-SSS) according to some embodiments of the present disclosure.

FIG. 3 illustrates one example structure of the NB-PSS and NB-SSS according to some embodiments of the present disclosure. In this example, the structure is for NB LTE.

Depicted in FIG. 3 are the:

PSS (also referred to herein as the NB-PSS): Three primary synchronization sequences are used as in LTE to determine the three cell IDs within a cell ID group. The NB-PSS spans six OFDM symbols and is used to determine the subframe timing as well as to correct the frequency offset. Note that in this design, the NB-PSS is contiguous in time.

SSS (also referred to herein as the NB-SSS): The secondary synchronization sequence spans six OFDM symbols and is used to determine the cell ID group and the M-frame timing. In order to support the same number of cell ID groups as in LTE, 168 different SSS sequences are designed.

From the design, it can be seen that the NB-PSS and the NB-SSS are repeated every 15 ms and occur four times within a 60 ms M-frame. Specifically, in the second and seventh M-subframes, which are referenced as M-subframe numbers 1 and 6, the synchronization sequences are present in the third subframe, which is referenced as subframe number 2. In the fourth and ninth M-subframes, which are referenced as M-subframe numbers 3 and 8, the synchronization sequences are present in the sixth subframe, which referenced as subframe number 5. In the subframes containing the synchronization sequences, the NB-PSS occupies the last six OFDM symbols, and the NB-SSS occupies the second to seventh OFDM symbols. In the illustrated example, the NB-PSS occurs four times over the 60 ms time interval. Specifically, a first occurrence of the NB-PSS occurs in the last six OFDM symbols of subframe number 2 of M-subframe number 1, a second occurrence of the NB-PSS occurs in the last six OFDM symbols of subframe number 5 of M-subframe number 3, a third occurrence of the NB-PSS occurs in the last six OFDM symbols of subframe number 2 of M-subframe number 6, and a fourth occurrence of the NB-PSS occurs in the last six OFDM symbols of subframe number 5 of M-subframe number 8. In a similar manner, a first occurrence of the NB-SSS occurs in the second through seventh OFDM symbols of subframe number 2 of M-subframe number 1, a second occurrence of the NB-SSS occurs in the second through seventh OFDM symbols of subframe number 5 of M-subframe number 3, a third occurrence of the NB-SSS occurs in the second through seventh OFDM symbols of subframe number 2 of M-subframe number 6, and a fourth occurrence of the NB-SSS occurs in the second through seventh OFDM symbols of subframe number 5 of M-subframe number 8.

With respect to LTE, the design of the synchronization sequences in NB LTE are very much similar in the sense that each instance, or occurrence, of PSS and SSS occupies 72 subcarriers both in LTE as well as in NB LTE (one OFDM symbol contains 12 subcarriers in NB-LTE), except for the fact that the PSS/SSS are repeated four times within an M-frame compared to two times repetition within a frame in LTE. This is done to enable faster synchronization as well as to reduce memory consumption at the user terminal. However, because of the four times repetition, a slightly modified design is required for the SSS to obtain the M-frame timing, as described below.

In LTE, the structure of the PSS allows a low complexity design of the timing and frequency offset estimator, and the SSS is designed to obtain frame timing and enable support for 168 unique cell ID groups. The same design guidelines are adopted here for NB-LTE.

NB Primary Synchronization Sequence Design

One example of the NB-PSS sequence design is as follows. Three different NB-PSSs are specified for NB-LTE. In LTE PSS design, a certain number of frequency hypotheses are used for each PSS in order to determine the symbol timing and a coarse estimation of the frequency offset. Adopting the same design in NB LTE would give rise to a higher receiver processing complexity due to the use of multiple frequency hypotheses. In order to cater to this problem, a differentially encoded Zadoff-Chu sequence is proposed for the NB-PSS. The base sequence is a length-71 Zadoff sequence, and three different sequences are obtained using three different roots u. Thus, the three different NB-PSS sequences can be defined as follows:

$$c_u(n) = e^{-\frac{j\pi u n(n+1)}{N}}, u = \{1, 13, 27\}, n = \{0, 1, 2, \ldots, 70\}$$

The base sequence $c_u(n)$ is differentially encoded, upsampled, and then filtered so that it is restricted to the 200 kHz (or 180 kHz) bandwidth. The differentially encoded sequence $d_u(n)$ is given as $$d_u(n+1) = d_u(n)c_u(n), n = \{0, 1, 2, \ldots, 70\}, d_u(0) = 1,$$

The upsampled and filtered sequence $p_u(n)$ corresponding to a root u is obtained from $d_u(n)$ as follows $$p_u(n) = IFFT(FFT(d_u(n), 72), 720)$$

Note that the above expression for $p_u(n)$ captures both the upsampling and filtering effect. The sequence $p_u(n)$ is then padded with 48 zeros to obtain a length-768 sequence $t_u(n)$. In the transmission phase, the length-768 sequence is first divided into six length-128 subsequences, and cyclic prefix is added to each of the six subsequences to give the NB-PSS. Note that each of the subsequences constitutes one OFDM symbol, so that the NB-PSS occupies six OFDM symbols.

A comparison with LTE reveals that the frequency of occurrence of the NB-PSS in NB LTE gives a slightly larger overhead as compared to that for the PSS in LTE. Specifically, the synchronization sequences used in LTE occupy 1.43% of the total transmission resource, and the ones used in NB LTE occupy approximately 2.8% of the total resource. This extra overhead comes with the advantage of reducing the synchronization time as well as the memory consumption by a factor of 2, leading to improved battery life and lower device cost.

NB Secondary Synchronization Sequence Design

One example of the NB-PSS sequence design is as follows. The NB-SSS sequence is designed in the frequency domain and occupies 72 subcarriers corresponding to six OFDM symbols. The NB-SSS is composed of two length 31 Zadoff-Chu sequences padded with five zeros at the beginning and end. The two sequences are chosen in order to provide support for 168 unique cell ID groups. The reason for using Zadoff-Chu sequences in NB LTE compared to m-sequences in LTE is to provide robustness to the "phantom cell effect," which arises due to the presence of a common sequence for two different cell ID groups.

Since the NB-PSS/NB-SSS occur four times within an M-frame (i.e., since the NB-PSS/NB-SSS each occur more than two times in the defined time interval), the LTE design of the SSS cannot be used to provide the frame timing. This is because the special interleaving structure used for the SSS in LTE can be used to determine which of only two positions that an SSS occurs, whereas, for the example of FIG. 3, there are four positions in which an SSS can occur. Therefore, a scrambling code is used on top of the two Zadoff-Chu sequences in order to provide information about the frame timing. Four scrambling codes are required to determine the four locations within the M-frame, which can be leveraged to obtain the correct frame timing.

Specifically, the SSS is given as $s_{p,q}(n) = a_p(n)b_q(n)$, where $p = \{0, 1, \ldots, 167\}$ denotes the cell ID group and $q = \{0, 1, 2, 3\}$ determines the location of the SSS, i.e., the number of SSS in the M-frame that have occurred before the current SSS. The sequence $a_p(n)$ and the scrambling code $b_q(n)$ are defined as:

$$a_p(n) = 0, n = \{0 - 4, 67 - 71\}$$
$$= a_p^1(\mod(n - k_p - 5, 31)), n = \{5, 6, \ldots, 35\}$$
$$= a_p^2(\mod(n - k_p - 36, 31)), n = \{36, 37, \ldots, 66\}$$

$$a_p^1(n) = e^{-\frac{j\pi m_1(p)n(n+1)}{N}}, n = \{0, 1, \ldots, 30\}$$

$$a_p^2(n) = e^{-\frac{j\pi m_2(p)n(n+1)}{N}}, n = \{0, 1, \ldots, 30\}$$

$$b_q(n) = b(\mod(n - l_q, 63)) \, n = \{0, 1, \ldots 61\},$$

$$b(n + 6) = \mod(b(n) + b(n + 1), 2), n = \{0, 1, \ldots 55\},$$

$$b(0) = 1, b(m) = 0, m = \{1, 2, 3, 4, 5\}$$

Note that $a_p(n)$ is composed of two Zadoff-Chu sequences and determines the cell ID group. The cyclic shifts $m_1(p)$ and $m_2(p)$ are chosen to provide a specific cell ID group and the cyclic shift $k_p$ is used to remove the "phantom cell effect" present in LTE design. $b_q(n)$ is the scrambling sequence composed of cyclic shifts of a base sequence $b(n)$ and is used to indicate the SSS location within an M-frame in order to obtain the frame timing. Note that the cyclic shift $l_q$ is dependent on q (i.e., the location of the NB-SSS within the M-frame), and $l_0=0, l_1=3, l_2=7, l_3=13$. Note also that $b_q(n)$ is a length-62 sequence, which is used to scramble the non-zero portion of sequence $a_p(n)$ (i.e. the middle 62 elements of $a_p(n)$). An example of the values of $m_1(p), m_2(p)$ and $k_p$ for a specific cell ID group p are provided in Table 1 below.

TABLE 1

($m_1$, $m_2$, k) for a specific cell identity group p

| p | $m_1(p)$ | $m_2(p)$ | $k_p$ |
|---|---|---|---|
| 0 | 1 | 2 | 0 |
| 1 | 2 | 3 | 0 |
| 2 | 3 | 4 | 0 |
| 3 | 4 | 5 | 0 |
| 4 | 5 | 6 | 0 |
| 5 | 6 | 7 | 0 |
| 6 | 7 | 8 | 0 |
| 7 | 8 | 9 | 0 |
| 8 | 9 | 10 | 0 |
| 9 | 10 | 11 | 0 |
| 10 | 11 | 12 | 0 |
| 11 | 12 | 13 | 0 |
| 12 | 13 | 14 | 0 |
| 13 | 14 | 15 | 0 |
| 14 | 15 | 16 | 0 |
| 15 | 16 | 17 | 0 |
| 16 | 17 | 18 | 0 |
| 17 | 18 | 19 | 0 |
| 18 | 19 | 20 | 0 |
| 19 | 20 | 21 | 0 |
| 20 | 21 | 22 | 0 |
| 21 | 22 | 23 | 0 |
| 22 | 23 | 24 | 0 |
| 23 | 24 | 25 | 0 |
| 24 | 25 | 26 | 0 |
| 25 | 26 | 27 | 0 |
| 26 | 27 | 28 | 0 |
| 27 | 28 | 29 | 0 |
| 28 | 29 | 30 | 0 |
| 29 | 1 | 3 | 4 |
| 30 | 2 | 4 | 4 |
| 31 | 3 | 5 | 4 |
| 32 | 4 | 6 | 4 |
| 33 | 5 | 7 | 4 |
| 34 | 6 | 8 | 4 |
| 35 | 7 | 9 | 4 |
| 36 | 8 | 10 | 4 |
| 37 | 9 | 11 | 4 |
| 38 | 10 | 12 | 4 |
| 39 | 11 | 13 | 4 |
| 40 | 12 | 14 | 4 |
| 41 | 13 | 15 | 4 |
| 42 | 14 | 16 | 4 |
| 43 | 15 | 17 | 4 |
| 44 | 16 | 18 | 4 |
| 45 | 17 | 19 | 4 |
| 46 | 18 | 20 | 4 |
| 47 | 19 | 21 | 4 |
| 48 | 20 | 22 | 4 |
| 49 | 21 | 23 | 4 |
| 50 | 22 | 24 | 4 |
| 51 | 23 | 25 | 4 |
| 52 | 24 | 26 | 4 |
| 53 | 25 | 27 | 4 |
| 54 | 26 | 28 | 4 |
| 55 | 27 | 29 | 4 |
| 56 | 28 | 30 | 4 |
| 57 | 1 | 4 | 8 |
| 58 | 2 | 5 | 8 |
| 59 | 3 | 6 | 8 |
| 60 | 4 | 7 | 8 |
| 61 | 5 | 8 | 8 |
| 62 | 6 | 9 | 8 |
| 63 | 7 | 10 | 8 |
| 64 | 8 | 11 | 8 |
| 65 | 9 | 12 | 8 |
| 66 | 10 | 13 | 8 |
| 67 | 11 | 14 | 8 |
| 68 | 12 | 15 | 8 |
| 69 | 13 | 16 | 8 |
| 70 | 14 | 17 | 8 |
| 71 | 15 | 18 | 8 |
| 72 | 16 | 19 | 8 |
| 73 | 17 | 20 | 8 |
| 74 | 18 | 21 | 8 |
| 75 | 19 | 22 | 8 |
| 76 | 20 | 23 | 8 |
| 77 | 21 | 24 | 8 |
| 78 | 22 | 25 | 8 |
| 79 | 23 | 26 | 8 |
| 80 | 24 | 27 | 8 |
| 81 | 25 | 28 | 8 |
| 82 | 26 | 29 | 8 |
| 83 | 27 | 30 | 8 |
| 84 | 1 | 5 | 12 |
| 85 | 2 | 6 | 12 |
| 86 | 3 | 7 | 12 |
| 87 | 4 | 8 | 12 |
| 88 | 5 | 9 | 12 |
| 89 | 6 | 10 | 12 |
| 90 | 7 | 11 | 12 |
| 91 | 8 | 12 | 12 |
| 92 | 9 | 13 | 12 |
| 93 | 10 | 14 | 12 |
| 94 | 11 | 15 | 12 |
| 95 | 12 | 16 | 12 |
| 96 | 13 | 17 | 12 |
| 97 | 14 | 18 | 12 |
| 98 | 15 | 19 | 12 |
| 99 | 16 | 20 | 12 |
| 100 | 17 | 21 | 12 |
| 101 | 18 | 22 | 12 |
| 102 | 19 | 23 | 12 |
| 103 | 20 | 24 | 12 |
| 104 | 21 | 25 | 12 |
| 105 | 22 | 26 | 12 |
| 106 | 23 | 27 | 12 |
| 107 | 24 | 28 | 12 |
| 108 | 25 | 29 | 12 |
| 109 | 26 | 30 | 12 |
| 110 | 1 | 6 | 16 |
| 111 | 2 | 7 | 16 |
| 112 | 3 | 8 | 16 |
| 113 | 4 | 9 | 16 |
| 114 | 5 | 10 | 16 |
| 115 | 6 | 11 | 16 |
| 116 | 7 | 12 | 16 |
| 117 | 8 | 13 | 16 |
| 118 | 9 | 14 | 16 |
| 119 | 10 | 15 | 16 |
| 120 | 11 | 16 | 16 |
| 121 | 12 | 17 | 16 |
| 122 | 13 | 18 | 16 |
| 123 | 14 | 19 | 16 |
| 124 | 15 | 20 | 16 |
| 125 | 16 | 21 | 16 |
| 126 | 17 | 22 | 16 |
| 127 | 18 | 23 | 16 |
| 128 | 19 | 24 | 16 |
| 129 | 20 | 25 | 16 |
| 130 | 21 | 26 | 16 |
| 131 | 22 | 27 | 16 |
| 132 | 23 | 28 | 16 |
| 133 | 24 | 29 | 16 |
| 134 | 25 | 30 | 16 |
| 135 | 1 | 7 | 20 |
| 136 | 2 | 8 | 20 |
| 137 | 3 | 9 | 20 |
| 138 | 4 | 10 | 20 |
| 139 | 5 | 11 | 20 |
| 140 | 6 | 12 | 20 |

TABLE 1-continued (m₁, m₂, k) for a specific cell identity group p

| p | m₁(p) | m₂(p) | $k_p$ |
|---|---|---|---|
| 141 | 7 | 13 | 20 |
| 142 | 8 | 14 | 20 |
| 143 | 9 | 15 | 20 |
| 144 | 10 | 16 | 20 |
| 145 | 11 | 17 | 20 |
| 146 | 12 | 18 | 20 |
| 147 | 13 | 19 | 20 |
| 148 | 14 | 20 | 20 |
| 149 | 15 | 21 | 20 |
| 150 | 16 | 22 | 20 |
| 151 | 17 | 23 | 20 |
| 152 | 18 | 24 | 20 |
| 153 | 19 | 25 | 20 |
| 154 | 20 | 26 | 20 |
| 155 | 21 | 27 | 20 |
| 156 | 22 | 28 | 20 |
| 157 | 23 | 29 | 20 |
| 158 | 24 | 30 | 20 |
| 159 | 1 | 8 | 24 |
| 160 | 2 | 9 | 24 |
| 161 | 3 | 10 | 24 |
| 162 | 4 | 11 | 24 |
| 163 | 5 | 12 | 24 |
| 164 | 6 | 13 | 24 |
| 165 | 7 | 14 | 24 |
| 166 | 8 | 15 | 24 |
| 167 | 9 | 16 | 24 |

Figure 4:
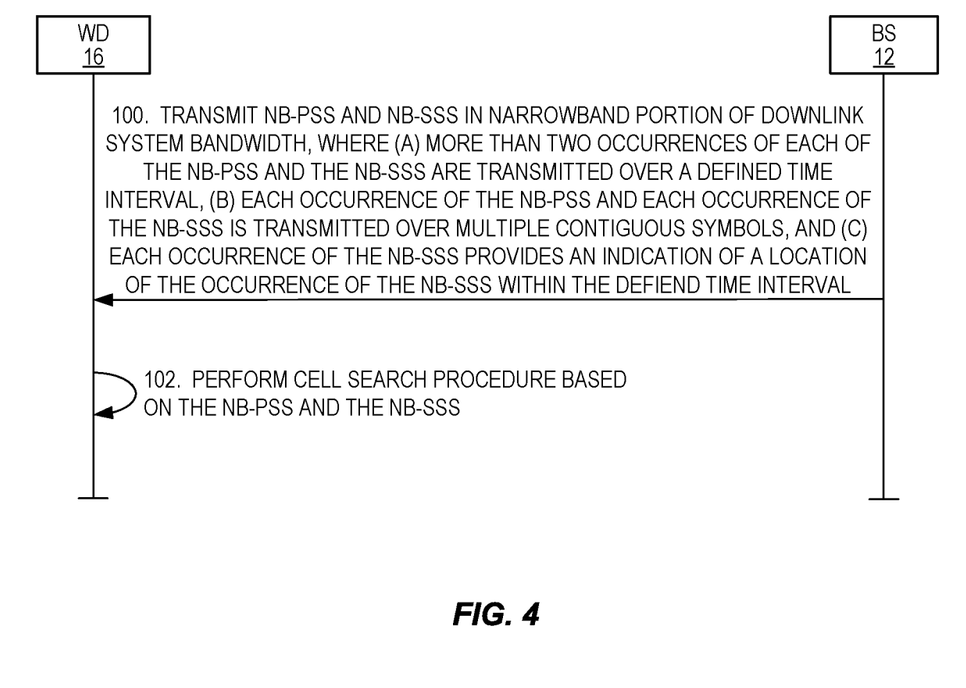
FIG. 4 illustrates the operation of the base station and the wireless device of FIG. 2 to enable cell search based on a NB-PSS and a NB-SSS according to some embodiments of the present disclosure.

FIG. 4 illustrates the operation of the base station 12 and the wireless device 16 to enable cell search according to some embodiments of the present disclosure. As illustrated, the base station 12 transmits the NB-PSS and the NB-SSS (step 100). As discussed above, the base station 12 transmits the NB-PSS and the NB-SSS in a NB portion (e.g., 180 kHz or 200 kHz portion) of the full downlink system bandwidth of the base station 12, which, for LTE, is greater than or equal to 1.4 MHz. As discussed above, more than two occurrences (e.g., four occurrences) of the NB-PSS and more than two occurrences (e.g., four occurrences) of the NB-SSS are transmitted over a defined time interval (e.g., 60 ms). Each occurrence of the NB-PSS is transmitted over multiple (e.g., six) contiguous OFDM symbols. Likewise, each occurrence of the NB-SSS is transmitted over multiple (e.g., six) contiguous OFDM symbols. Since there are multiple occurrences of the NB-SSS within the defined time interval, each occurrence of the NB-SSS provides an indication of the location of that occurrence of the NB-SSS within the defined time interval. For example, each occurrence of the NB-SSS may incorporate a different scrambling code such that the scrambling code used for a particular occurrence of the NB-SSS indicates the location of the NB-SSS within the defined time interval.

The wireless device 16 performs a cell search procedure based on the NB-PSS and the NB-SSS (step 102). As discussed above, the wireless device 16 first detects the NB-PSS. Based on the detected NB-PSS, the wireless device 16 is able to determine the symbol timing and a coarse estimation of the frequency offset for the respective cell. Further, in the embodiments described above, the wireless device 16 is also able to determine the cell ID of the respective cell within a cell ID group (which will be determined by the wireless device 16 based on the detected NB-SSS) based on the detected NB-PSS. The wireless device 16 then detects the NB-SSS. In particular, the wireless device 16 detects an occurrence of the NB-SSS. Based on the detected occurrence of the NB-SSS, the wireless device 16 is able to determine the cell group ID of the respective cell and the location of the frame timing.

Certain embodiments are based on designing a cell search procedure for NB LTE that not only achieves competitive cell synchronization performance for MTC type devices, but also provides backward compatibility with existing LTE systems.

The design of the PSS incorporates the basic design principles of a sequence that is robust to frequency errors and also has good correlation properties. This makes it useful to determine both the time and frequency offset with a low complexity receiver algorithm. In addition, the PSS design enables backward compatibility with existing LTE systems. Even though the final PSS is not representative of the Zadoff sequence because of the inclusion of a cyclic prefix term, the properties of the sequence are not completely destroyed enabling good performance in time as well as frequency offset estimation.

In bad or extended coverage the above time and frequency estimation uses accumulation of multiple frames to achieve sufficient accuracy.

(Achieving synchronization depends on the number of frames that are needed to be accumulated, and the synchronization time depends on the repetition interval of the sequences. More repetitions need lesser time but require more complexity to determine the frame timing, while less repetitions require more time but less complexity for obtaining the frame timing).

The SSS design is robust to the phantom cell effect. This is achieved by choosing the sequences within the SSS carefully so that no two SSSs belonging to different cell ID groups have the same common sequence. The SSS design also makes use of scrambling sequences to determine the location within a subframe and thus, obtain frame timing.

It is to be noted that any feature of any of the embodiments disclosed herein may be applied to any other embodiment, wherever appropriate. Likewise, any advantage of any of the embodiments may apply to the other embodiments, and vice versa. Other objectives, features, and advantages of the enclosed embodiments will be apparent from the following description.

Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

Some of the embodiments contemplated herein will now be described more fully hereinafter with reference to the accompanying drawings. Other embodiments, however, are contained within the scope of this disclosure and the present disclosure should not be construed as limited to only the embodiments set forth herein; rather, these embodiments are provided by way of example so that this disclosure will be thorough and complete, and will fully convey the scope of the inventive concept to those skilled in the art. Like numbers refer to like elements throughout the description.

Figure 5:
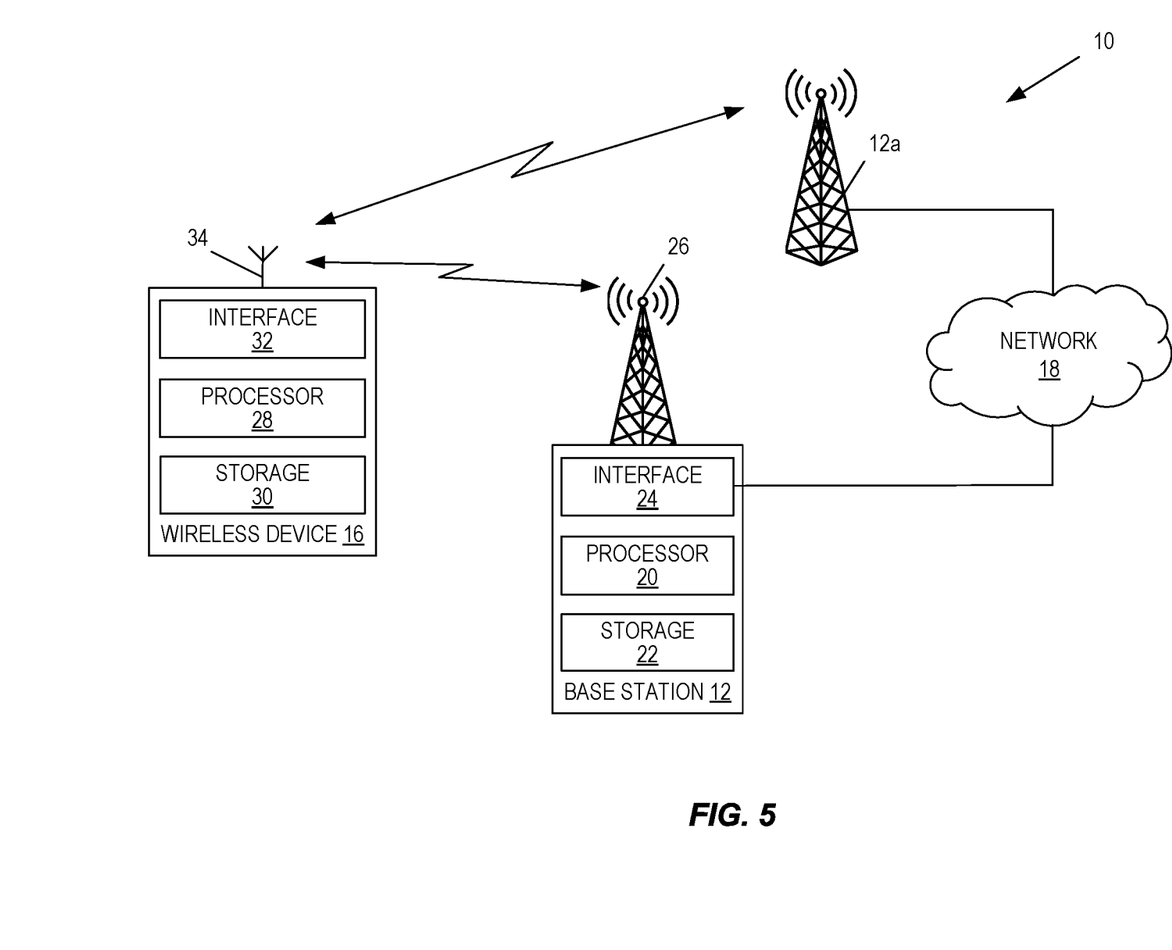
FIG. 5 is a more detailed illustration of the wireless network of FIG. 2 according to some embodiments of the present disclosure.

FIG. 5 illustrates the wireless network 10 comprising a more detailed view of the base station 12 (which is more generally referred to with respect to FIG. 5 as a network node 12) and the wireless device 16, in accordance with a particular embodiment. For simplicity, FIG. 5 only depicts a network 18, network nodes 12 and 12a, and wireless device 16. The network node 12 comprises a processor 20, storage 22, an interface 24, and an antenna 26. Similarly, the wireless device 16 comprises a processor 28, storage 30, an interface 32 and an antenna 34. These components may work together in order to provide network node and/or wireless device functionality, such as providing wireless connections in a wireless network. In different embodiments, the wireless network 10 may comprise any number of wired or wireless networks, network nodes, base stations, controllers, wireless devices, relay stations, and/or any other components that may facilitate or participate in the communication of data and/or signals whether via wired or wireless connections.

The network 18 may comprise one or more Internet Protocol (IP) networks, Public Switched Telephone Networks (PSTNs), packet data networks, optical networks, Wide Area Networks (WANs), Local Area Networks (LANs), Wireless LANs (WLANs), wired networks, wireless networks, metropolitan area networks, and other networks to enable communication between devices.

The network node 12 comprises the processor 20, the storage 22, the interface 24, and the antenna 26. These components are depicted as single boxes located within a single larger box. In practice however, a network node may comprise multiple different physical components that make up a single illustrated component (e.g., the interface 24 may comprise terminals for coupling wires for a wired connection and a radio transceiver for a wireless connection). Similarly, the network node 12 may be composed of multiple physically separate components (e.g., a Node B component and a Radio Network Controller (RNC) component, a Base Transceiver Station (BTS) component and a Base Station Controller (BSC) component, etc.), which may each have their own respective processor, storage, and interface components. In certain scenarios in which the network node 12 comprises multiple separate components (e.g., BTS and BSC components), one or more of the separate components may be shared among several network nodes. For example, a single RNC may control multiple Node Bs. In such a scenario, each unique Node B and BSC pair may be a separate network node. In some embodiments, the network node 12 may be configured to support multiple Radio Access Technologies (RATs). In such embodiments, some components may be duplicated (e.g., separate storage 22 for the different RATs) and some components may be reused (e.g., the same antenna 26 may be shared by the RATs).

The processor 20 may be a combination of one or more of a microprocessor, a controller, a microcontroller, a Central Processing Unit (CPU), a digital signal processor, an Application Specific Integrated Circuit (ASIC), a Field Programmable Gate Array (FPGA), or any other suitable computing device, resource, or combination of hardware, software, and/or encoded logic operable to provide, either alone or in conjunction with other network node 12 components, such as the storage 22, network node 12 functionality. For example, the processor 20 may execute instructions stored in the storage 22. Such functionality may include providing various wireless features discussed herein to wireless devices, such as the wireless device 16, including any of the features or benefits disclosed herein.

The storage 22 may comprise any form of volatile or non-volatile computer readable memory including, without limitation, persistent storage, solid state memory, remotely mounted memory, magnetic media, optical media, Random Access Memory (RAM), Read Only Memory (ROM), removable media, or any other suitable local or remote memory component. The storage 22 may store any suitable instructions, data, or information, including software and encoded logic, utilized by the network node 12. The storage 22 may be used to store any calculations made by the processor 20 and/or any data received via the interface 24.

The network node 12 also comprises the interface 24 which may be used in the wired or wireless communication of signaling and/or data between the network node 12, the network 18, and/or the wireless device 16. For example, the interface 24 may perform any formatting, coding, or translating that may be needed to allow the network node 12 to send and receive data from the network 18 over a wired connection. The interface 24 may also include a radio transmitter and/or receiver that may be coupled to or a part of the antenna 26. The radio may receive digital data that is to be sent out to other network nodes or wireless device via a wireless connection. The radio may convert the digital data into a radio signal having the appropriate channel and bandwidth parameters. The radio signal may then be transmitted via the antenna 26 to the appropriate recipient (e.g., the wireless device 16).

The antenna 26 may be any type of antenna capable of transmitting and receiving data and/or signals wirelessly. In some embodiments, the antenna 26 may comprise one or more omni-directional, sector, or panel antennas operable to transmit/receive radio signals between, for example, 2 gigahertz (GHz) and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

The wireless device 16 may be any type of wireless endpoint, wireless machine, mobile station, mobile phone, wireless local loop phone, smartphone, UE, desktop computer, personal digital assistant, cell phone, tablet, laptop, Voice over IP (VoIP) phone or handset, which is able to wirelessly send and receive data and/or signals to and from a network node, such as the network node 12 and/or other wireless devices. The wireless device 16 comprises the processor 28, the storage 30, the interface 32, and the antenna 34. Like the network node 12, the components of the wireless device 16 are depicted as single boxes located within a single larger box, however in practice a wireless device may comprise multiple different physical components that make up a single illustrated component (e.g., the storage 30 may comprise multiple discrete microchips, each microchip representing a portion of the total storage capacity).

The processor 28 may be a combination of one or more of a microprocessor, a controller, a microcontroller, a CPU, a digital signal processor, an ASIC, a FPGA, or any other suitable computing device, resource, or combination of hardware, software, and/or encoded logic operable to provide, either alone or in combination with other wireless device 16 components, such as the storage 30, wireless device 16 functionality. Such functionality may include providing various wireless features discussed herein, including any of the features or benefits disclosed herein.

The storage 30 may be any form of volatile or non-volatile memory including, without limitation, persistent storage, solid state memory, remotely mounted memory, magnetic media, optical media, RAM, ROM, removable media, or any other suitable local or remote memory component. The storage 30 may store any suitable data, instructions, or information, including software and encoded logic, utilized by the wireless device 16. The storage 30 may be used to store any calculations made by the processor 28 and/or any data received via the interface 32.

The interface 32 may be used in the wireless communication of signaling and/or data between the wireless device 16 and the network node 12. For example, the interface 32 may perform any formatting, coding, or translating that may be needed to allow the wireless device 16 to send and receive data from the network node 12 over a wireless connection. The interface 32 may also include a radio transmitter and/or receiver that may be coupled to or a part of the antenna 34. The radio may receive digital data that is to be sent out to the network node 12 via a wireless connection. The radio may convert the digital data into a radio signal having the appropriate channel and bandwidth parameters. The radio signal may then be transmitted via the antenna 34 to the network node 12.

The antenna 34 may be any type of antenna capable of transmitting and receiving data and/or signals wirelessly. In some embodiments, the antenna 34 may comprise one or more omni-directional, sector, or panel antennas operable to transmit/receive radio signals between 2 GHz and 66 GHz. For simplicity, the antenna 34 may be considered a part of the interface 32 to the extent that a wireless signal is being used.

Any steps described herein are merely illustrative of certain embodiments. It is not required that all embodiments incorporate all the steps disclosed nor that the steps be performed in the exact order depicted or described herein. Furthermore, some embodiments may include steps not illustrated or described herein, including steps inherent to one or more of the steps disclosed herein.

Any appropriate steps, methods, or functions may be performed through a computer program product that may, for example, be executed by the components and equipment illustrated in the figure above. For example, the storage 22 may comprise computer readable means on which a computer program can be stored. The computer program may include instructions which cause the processor 20 (and any operatively coupled entities and devices, such as the interface 24 and the storage 22) to execute methods according to embodiments described herein. The computer program and/or computer program product may thus provide means for performing any steps herein disclosed.

Any appropriate steps, methods, or functions may be performed through one or more functional modules. Each functional module may comprise software, computer programs, sub-routines, libraries, source code, or any other form of executable instructions that are executed by, for example, a processor. In some embodiments, each functional module may be implemented in hardware and/or in software. For example, one or more or all functional modules may be implemented by the processors 28 and/or 20, possibly in cooperation with the storage 30 and/or 22. The processors 28 and/or 20 and the storage 30 and/or 22 may thus be arranged to allow the processors 28 and/or 20 to fetch instructions from the storage 30 and/or 22 and execute the fetched instructions to allow the respective functional module to perform any steps or functions disclosed herein.

Figure 6:
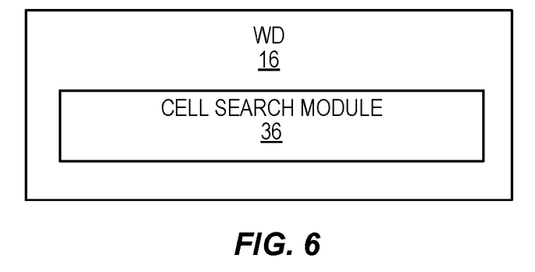
FIG. 6 illustrates a wireless device according to some embodiments of the present disclosure.

FIG. 6 illustrates the wireless device 16 according to some embodiments of the present disclosure. As discussed above, in some embodiments, the functionality of the wireless device 16 may be implemented in one or more functional modules. In this example, the wireless device 16 includes a cell search module 36, which is implemented in software and operates to perform the cell search procedure based on NB-PSS and NB-SSS, as described above.

Figure 7:
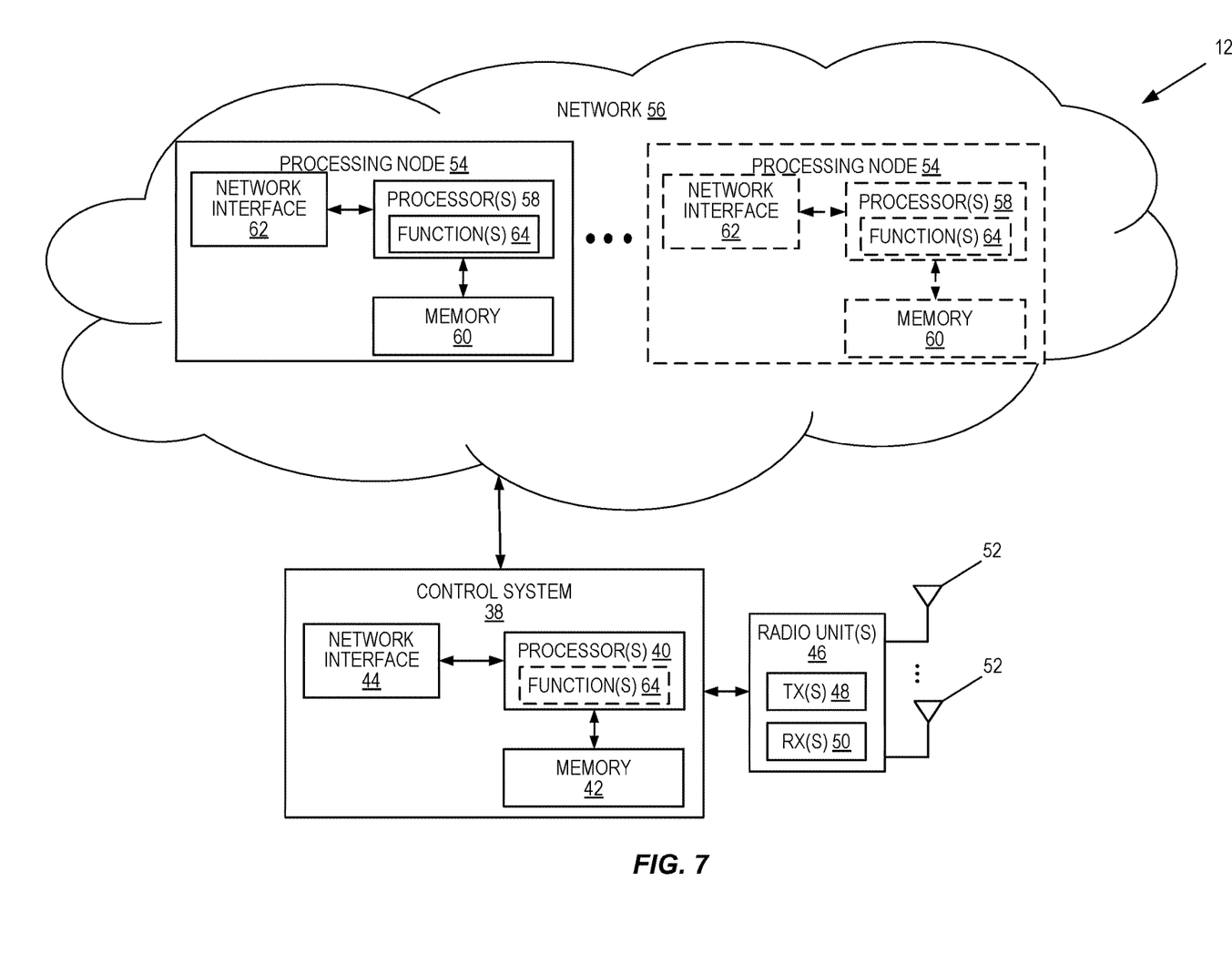
FIGS. 7 and 8 illustrate a network node according to some embodiments of the present disclosure.

FIG. 7 is a schematic block diagram that illustrates a virtualized embodiment of the network node 12 according to some embodiments of the present disclosure. This discussion is equally applicable to other types of network nodes. Further, other types of network nodes may have similar virtualized architectures.

As used herein, a "virtualized" network node is an implementation of the network node 12 in which at least a portion of the functionality of the network node 12 is implemented as a virtual component(s) (e.g., via a virtual machine(s) executing on a physical processing node(s) in a network(s)). As illustrated, in this example, the network node 12 includes a control system 38 that includes one or more processors 40 (e.g., CPUs, DSPs, ASICs, FPGAs, and/or the like), memory 42, and network interface 44. In addition, since the network node 12 is a radio network node (e.g., a base station), the network node 12 further includes one or more radio units 46 that each includes one or more transmitters 48 and one or more receivers 50 coupled to one or more antennas 52. The control system 38 is connected to the radio unit(s) 46 via, for example, an optical cable or the like. The control system 38 is connected to one or more processing nodes 54 coupled to or included as part of a network(s) 56 via the network interface 44. Each processing node 54 includes one or more processors 58 (e.g., CPUs, DSPs, ASICs, FPGAs, and/or the like), memory 60, and a network interface 62.

In this example, functions 64 of the network node 12 described herein are implemented at the one or more processing nodes 54 or distributed across the control system 38 and the one or more processing nodes 54 in any desired manner. In some particular embodiments, some or all of the functions 64 of the network node 12 described herein are implemented as virtual components executed by one or more virtual machines implemented in a virtual environment(s) hosted by the processing node(s) 54. As will be appreciated by one of ordinary skill in the art, additional signaling or communication between the processing node(s) 54 and the control system 38 is used in order to carry out at least some of the desired functions 64. Notably, in some embodiments, the control system 38 may not be included, in which case the radio unit(s) 46 communicates directly with the processing node(s) 54 via an appropriate network interface(s).

In some embodiments, a computer program including instructions which, when executed by at least one processor, causes the at least one processor to carry out the functionality of network node 12 or a node (e.g., a processing node 54) implementing one or more of the functions 64 the network node 12 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 8:
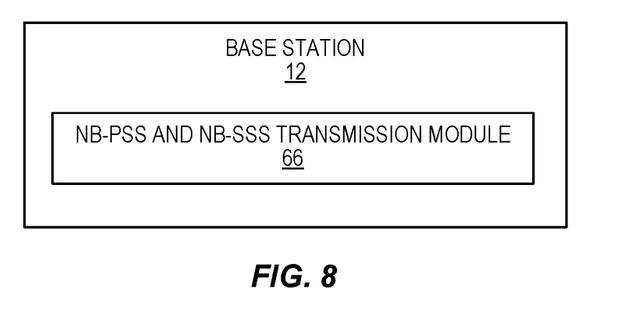

FIG. 8 illustrates the base station 12, or more generally network node 12, according to some embodiments of the present disclosure. As discussed above, in some embodiments, the functionality of the base station 12 may be implemented in one or more functional modules. In this example, the base station 12 includes a NB-PSS and NB-SSS transmission module 66, which is implemented in software and operates to transmit NB-PSS and NB-SSS, as described above.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and/or combined with different features.

The following acronyms are used throughout this disclosure.

| | |
|---|---|
| 3GPP | Third Generation Partnership Project |
| ASIC | Application Specific Integrated Circuit |
| BSC | Base Station Controller |
| BTS | Base Transceiver Station |
| CPU | Central Processing Unit |
| EDGE | Enhanced Data Rates for GSM Evolution |
| FDD | Frequency Division Duplexing |
| FPGA | Field Programmable Gate Array |
| GERAN | Global System for Mobile Communications/Enhanced Data Rates for GSM Evolution Radio Access Network |
| GHz | Gigahertz |
| GSM | Global System for Mobile Communications |
| ID | Identity |
| IoT | Internet of Things |
| IP | Internet Protocol |
| kHz | Kilohertz |
| LAN | Local Area Network |
| LTE | Long Term Evolution |
| M2M | Machine-to-Machine |
| MHz | Megahertz |
| ms | Millisecond |
| MTC | Machine Type Communication |
| NB | Narrowband |
| OFDM | Orthogonal Frequency Division Multiplexing |
| PSS | Primary Synchronization Signal |
| PSTN | Public Switched Telephone Network |
| RAM | Random Access Memory |
| RAT | Radio Access Technology |
| RNC | Radio Network Controller |
| ROM | Read Only Memory |
| SSS | Secondary Synchronization Signal |
| TDD | Time Division Duplexing |
| UE | User Equipment |
| VoIP | Voice over Internet Protocol |
| WAN | Wide Area Network |
| WLAN | Wireless Local Area Network |

Those skilled in the art will recognize improvements and modifications to the embodiments of the present disclosure. All such improvements and modifications are considered within the scope of the concepts disclosed herein and the claims that follow.

What is claimed is:

1. A base station in a wireless network, comprising:
a processor; and
storage that stores instructions executable by the processor whereby the base station is operable to:
transmit a narrowband Primary Synchronization Signal, NB-PSS, and a narrowband Secondary Synchronization Signal, NB-SSS, in a narrowband portion of a downlink system bandwidth, wherein:
multiple occurrences of the NB-PSS and multiple occurrences of the NB-SSS are transmitted over a defined time interval;
each occurrence of the NB-PSS is transmitted over multiple contiguous Orthogonal Frequency Division Multiplexing, OFDM, symbols and each occurrence of the NB-SSS is transmitted over multiple contiguous OFDM symbols; and
each occurrence of the NB-SSS provides an indication of only one particular position of four possible positions, within the defined time interval, of that occurrence of the NB-SSS.

2. The base station of claim 1 wherein the narrowband portion of the downlink system bandwidth consists of 12 OFDM subcarriers.

3. The base station of claim 1 wherein the narrowband portion of the downlink system bandwidth has a bandwidth of 200 kilohertz, kHz.

4. The base station of claim 1 wherein the narrowband portion of the downlink system bandwidth has a bandwidth of 180 kilohertz, kHz.

5. The base station of claim 1 wherein the downlink system bandwidth is greater than or equal to 1.4 megahertz, MHz.

6. The base station of claim 1 wherein a NB-PSS sequence for the NB-PSS is a differentially encoded Zadoff-Chu sequence.

7. The base station of claim 1 wherein the NB-PSS provides an indication of a cell identity within a cell identity group for a respective cell.

8. The base station of claim 1 wherein the NB-SSS provides an indication of a cell identity group for a respective cell.

9. The base station of claim 1 wherein four occurrences of the NB-SSS are transmitted over a defined time interval subsequent to the defined time interval, wherein each of the four occurrences transmitted over the subsequent time interval provides an indication of one of four possible positions, within the subsequent time interval, of that occurrence of the NB-SSS.

10. A method of operation of a base station in a wireless network, comprising:
transmitting a narrowband Primary Synchronization Signal, NB-PSS, and a narrowband Secondary Synchronization Signal, NB-SSS, in a narrowband portion of a downlink system bandwidth, wherein:
multiple occurrences of the NB-PSS and multiple occurrences of the NB-SSS are transmitted over a defined time interval;
each occurrence of the NB-PSS is transmitted over multiple contiguous Orthogonal Frequency Division Multiplexing, OFDM, symbols and each occurrence of the NB-SSS is transmitted over multiple contiguous OFDM symbols; and
each occurrence of the NB-SSS provides an indication of only one particular position of four possible positions, within the defined time interval, of that occurrence of the NB-SSS.

11. The method of claim 10 wherein the narrowband portion of the downlink system bandwidth consists of 12 OFDM subcarriers.

12. The method of claim 10 wherein the narrowband portion of the downlink system bandwidth has a bandwidth of 200 kilohertz, kHz.

13. The method of claim 10 wherein the narrowband portion of the downlink system bandwidth has a bandwidth of 180 kilohertz, kHz.

14. The method of claim 10 wherein the downlink system bandwidth is greater than or equal to 1.4 megahertz, MHz.

15. A wireless device in a wireless network, comprising:
a processor; and
storage that stores instructions executable by the processor whereby the wireless device is operable to:
perform a cell detection procedure based on a narrowband Primary Synchronization Signal, NB-PSS, and a narrowband Secondary Synchronization Signal, NB-SSS, received in a narrowband portion of a downlink system bandwidth, wherein:

multiple occurrences of the NB-PSS and multiple occurrences of the NB-SSS are transmitted over a defined time interval;

each occurrence of the NB-PSS is transmitted over multiple contiguous Orthogonal Frequency Division Multiplexing, OFDM, symbols and each occurrence of the NB-SSS is transmitted over multiple contiguous OFDM symbols; and each occurrence of the NB-SSS provides an indication of only one particular position of four possible positions, within the defined time interval, of that occurrence of the NB-SSS.

16. The wireless device of claim 15 wherein the narrowband portion of the downlink system bandwidth consists of 12 OFDM subcarriers.

17. The wireless device of claim 15 wherein the narrowband portion of the downlink system bandwidth has a bandwidth of 200 kilohertz, kHz.

18. The wireless device of claim 15 wherein the narrowband portion of the downlink system bandwidth has a bandwidth of 180 kilohertz, kHz.

19. The wireless device of claim 15 wherein the downlink system bandwidth is greater than or equal to 1.4 megahertz, MHz.

20. The wireless device of claim 15 wherein a NB-PSS sequence for the NB-PSS is a differentially encoded Zadoff-Chu sequence.

21. The wireless device of claim 15 wherein performing the cell detection procedure comprises:

detecting the NB-PSS; and determining a cell identity within a cell identity group for a respective cell based on the detected NB-PSS.

22. The wireless device of claim 15 wherein performing the cell detection procedure comprises:

detecting the NB-SSS; and determining a cell identity group for a respective cell and a frame timing for the respective cell based on the detected NB-SSS.

23. The wireless device of claim 15 wherein the defined time interval is a first defined time interval and the multiple occurrences of the NB-SSS are repeated in a second defined time interval subsequent to the first defined time interval at the same four possible positions as in the first defined time interval, and wherein each occurrence of the NB-SSS in the second defined time interval provides an indication of one of the four possible positions, within the second defined time interval, of that occurrence of the NB-SSS.

24. A method of operation of a wireless device in a wireless network, comprising:

performing a cell detection procedure based on a narrowband Primary Synchronization Signal, NB-PSS, and a narrowband Secondary Synchronization Signal, NB-SSS, received in a narrowband portion of a downlink system bandwidth, wherein:

multiple occurrences of the NB-PSS and multiple occurrences of the NB-SSS are transmitted over a defined time interval;

each occurrence of the NB-PSS is transmitted over multiple contiguous Orthogonal Frequency Division Multiplexing, OFDM, symbols and each occurrence of the NB-SSS is transmitted over multiple contiguous OFDM symbols; and each occurrence of the NB-SSS provides an indication of only one particular position of four possible positions, within the defined time interval, of that occurrence of the NB-SSS.

25. The base station of claim 1 wherein the defined time interval comprises a plurality of frames, each frame comprising a plurality of subframes, and wherein the indication of one of four possible positions, within the defined time interval, of that occurrence of the NB-SSS identifies one of the plurality of frames within the defined time interval and further identifies one of the plurality of subframes within the identified frame.

26. The method of claim 10 wherein the defined time interval comprises a plurality of frames, each frame comprising a plurality of subframes, and wherein the indication of one of four possible positions, within the defined time interval, of that occurrence of the NB-SSS identifies one of the plurality of frames within the defined time interval and further identifies one of the plurality of subframes within the identified frame.

27. The wireless device of claim 15 wherein the defined time interval comprises a plurality of frames, each frame comprising a plurality of subframes, and wherein the indication of one of four possible positions, within the defined time interval, of that occurrence of the NB-SSS identifies one of the plurality of frames within the defined time interval and further identifies one of the plurality of subframes within the identified frame.

28. The method of claim 24 wherein the defined time interval comprises a plurality of frames, each frame comprising a plurality of subframes, and wherein the indication of one of four possible positions, within the defined time interval, of that occurrence of the NB-SSS identifies one of the plurality of frames within the defined time interval and further identifies one of the plurality of subframes within the identified frame.

* * * * *